US 6,747,707 B2

United States Patent
Saito et al.

(10) Patent No.: US 6,747,707 B2
(45) Date of Patent: Jun. 8, 2004

(54) DATA EDITING SYSTEM FOR FINALLY EDITING A RECORDING MEDIUM USING RECEIVED COMPRESSED DATA

(75) Inventors: Hiroshi Saito, Neyagawa (JP); Yasuo Hamamoto, Sakai (JP); Kazuhiro Wake, Moriguchi (JP); Tatsuhiko Ikeda, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 428 days.

(21) Appl. No.: 09/823,071

(22) Filed: Mar. 30, 2001

(65) Prior Publication Data

US 2003/0206190 A1 Nov. 6, 2003

(30) Foreign Application Priority Data

Mar. 31, 2000 (JP) ........................................ 2000-097134

(51) Int. Cl.[7] .............................................. H04N 5/222
(52) U.S. Cl. .................. 348/722; 348/231.2; 348/231.3
(58) Field of Search ................................ 348/722, 473, 348/211.6, 231.2, 231.6, 231.3, 231.5, 231.4, 376; 386/52

(56) References Cited

U.S. PATENT DOCUMENTS

| | | | | |
|---|---|---|---|---|
| 6,345,122 B1 | * | 2/2002 | Yamato et al. | 382/232 |
| 6,470,264 B2 | * | 10/2002 | Bide | 701/207 |
| 6,510,278 B1 | * | 1/2003 | Takayama | 386/52 |
| 6,512,793 B1 | * | 1/2003 | Maeda | 375/240.08 |
| 2001/0041049 A1 | * | 11/2001 | Kanda | 386/52 |

* cited by examiner

Primary Examiner—Victor R. Kostak
(74) Attorney, Agent, or Firm—RatnerPrestia (57) ABSTRACT

A data editing system has
a data transmitting-side unit including a camera shooting a video; a recorder recording the video shot onto a predetermined recording medium; and a transmitter compressing the video shot by the camera and transmitting the compresed video.

The system also has a data editing-side unit including a receiver receiving the data transmitted from the data transmitting-side unit; editing instructions for performing the final editing of the video recorded on the recording medium by using the data received by the receiver; and a final editor performing the final editing of the video recorded on the recording medium based on the editing instruction.

23 Claims, 5 Drawing Sheets

DATA EDITING SYSTEM FOR FINALLY EDITING A RECORDING MEDIUM USING RECEIVED COMPRESSED DATA

BACKGROUND OF THE INVENTION

1. Field of the Invention

The present invention relates to a data editing system, a data editing-side unit, and the like for editing a video having been shot.

2. Related Art of the Invention

In the prior art, for example, when an event has occurred, a television broadcasting station sends a cameraman to the location of the event occurrence in order to collect news materials. At that location, the cameraman shoots a video with a camera thereby to record it on a tape. The cameraman or another person brings the tape back to the broadcasting station. An editor then edits the news material, for example, of an hour into broadcasting data which can be broadcasted, for example, in a three-minute article of a news program.

On the other hand, in case of a spots game such as a baseball game, or a music concert, a cameraman previously visits the location and shoots the video of the players in the game, the conductor and the players in the concert, the spectators or audience, and the like thereby to record it on a tape. Then, similarly to the above-mentioned case of an event, an editor edits it into broadcasting data after the tape is brought back to the broadcasting station.

In the above-mentioned editing in the broadcasting station, the editor reproduces the tape. Viewing the video being reproduced, the editor determines which portions are to be picked out, and then links the portions picked out.

Meanwhile, in general, the location of collecting news materials is geographically far apart from the broadcasting station and hence it takes a substantial time for the tape having recorded the video to reach the broadcasting station. Then, in the prior art described above, the editing by the editor is conducted after the arrival of the tape to the broadcasting station. Thus, it takes a much longer time to complete the editing. That is, in the prior art, the editor cannot edit the video of an event or a game having been shot until the tape having recorded the video reaches the broadcasting station.

SUMMARY OF THE INVENTION

Considering the above-mentioned problem, an object of the present invention is to provide a data editing system for completing the editing of a video in a shorter time than that of the prior art after the arrival of the tape having recorded the video to a broadcasting station, and a data editing-side unit included in the data editing system.

The 1st invention of the present invention is a data editing system comprising:

a data transmitting-side unit including at least: shooting means of shooting a video; recording means of recording the video shot by said shooting means onto a predetermined recording medium; compressing means of digitally compressing the video shot by said shooting means thereby to reduce the amount of data; and transmitting means of transmitting by wireless the data compressed by said compressing means; and a data editing-side unit including at least: receiving means of receiving the data transmitted from said data transmitting-side unit; editing instruction inputting means of accepting the instructions for performing the final editing of the video recorded on said recording medium by using the data received by said receiving means; and editing means of performing the final editing of the video recorded on said recording medium depending on said instructions accepted by said editing instruction inputting means.

The 2nd invention of the present invention is a data editing system according to 1st invention, wherein said compressing means performs said digital compression substantially in real time, and wherein said transmitting means transmits said compressed data substantially in real time.

Still another aspect of the present invention is a data editing system, wherein the performing said final editing by using said received data relates to performing draft editing on said received data and then performing the final editing by using the result of the draft editing.

Yet another aspect of the present invention is a data editing system, wherein said transmitting means and/or said receiving means is a mobile digital communication apparatus.

Still yet another aspect of the present invention is a data editing system, wherein said transmitting means further transmits additional information on said video.

A further aspect of the present invention is a data editing system, wherein said additional information includes all or a part of: the place of shooting said video; the time of shooting said video; and information accepted from a user of said data transmitting-side unit.

A still further aspect of the present invention is a data editing system, wherein said data editing-side unit comprises: information accepting means of accepting information from a user of the data editing-side unit; and second transmitting means of transmitting by wireless the information accepted by the information accepting means; and wherein said data transmitting-side unit comprises: second receiving means of receiving the information transmitted from said data editing-side unit; and information outputting means of outputting the information received by the second receiving means.

A yet further aspect of the present invention is a data editing system, further comprising distributing means of distributing all or a part of the data transmitted by said transmitting means of said data transmitting-side unit, onto the Internet substantially in real time.

A still yet further aspect of the present invention is a data editing system, wherein said data editing-side unit is located in a broadcasting station, and wherein during said Internet distribution, said distributing means distributes the publicity information on both the broadcasting channel and the broadcasting time of the edited data finally edited by said editing means, together with all or a part of the data transmitted by said transmitting means.

An additional aspect of the present invention is a data editing system, wherein said data editing-side unit is located in a broadcasting station, and further comprises:

third transmitting means of broadcasting the data finally edited by said editing means and of broadcasting the information indicating that all or a part of the video which is shot by said shooting means and is the source of the edited data is available from the Internet for the users on the receiving side of said edited data; and data storage controlling means of storing all or a part of the video shot by said shooting means into predetermined data storing means on said Internet so that the video is available from the Internet for the users on the receiving side of said edited data.

A still additional aspect of the present invention is a data editing system of, wherein said video includes a voice.

A yet additional aspect of the present invention is a data editing-side unit comprising at least:

receiving means of receiving the data transmitted from a data transmitting-side unit which shoots a video, then records the shot video onto a predetermined recording medium, then digitally compresses said shot video thereby to reduce the amount of data, and then transmits the compressed data by wireless;

editing instruction inputting means of accepting the instructions for performing the final editing of the video recorded on said recording medium by using the data received by said receiving means; and editing means of performing the final editing of the video recorded on said recording medium depending on said instructions accepted by said editing instruction inputting means.

A still yet additional aspect of the present invention is a data editing-side unit, wherein the performing said final editing by using said received data relates to performing a draft editing on said received data and then performing the final editing by using the result of the draft editing.

A supplementary aspect of the present invention is a data editing-side unit, wherein said receiving means is a mobile digital communication apparatus.

A still supplementary aspect of the present invention is a data editing-side unit comprising: information accepting means of accepting information from a user of the data editing-side unit; and transmitting means of transmitting by wireless the information accepted by the information accepting means.

A yet supplementary aspect of the present invention is a data editing-side unit, comprising distributing means of distributing all or a part of the data received by said receiving means, onto the Internet substantially in real time.

A still yet supplementary aspect of the present invention is a data editing-side unit, wherein said data editing-side unit is located in a broadcasting station, and wherein during said Internet distribution, said distributing means distributes the publicity information on both the broadcasting channel and the broadcasting time of the edited data finally edited by said editing means, together with all or a part of the data received by said receiving means.

Another aspect of the present invention is a data editing-side unit, wherein said data editing-side unit is located in a broadcasting station, and comprises:

second transmitting means of broadcasting the data finally edited by said editing means and of broadcasting the information indicating that all or a part of the video which is shot by the shooting means of said data transmitting-side unit and is the source of the edited data is available from the Internet for the users on the receiving side of said edited data; and wherein all or a part of the video shot by said shooting means is stored into predetermined data storing means on said Internet so that the video is available from the Internet for the users on the receiving side of said edited data.

Still another aspect of the present invention is a data editing-side unit, wherein said video includes a voice.

Yet another aspect of the present invention is a program for causing a computer to serve as all or a part of:

said recording means of recording the video shot by said shooting means onto a predetermined recording medium; said compressing means of digitally compressing the video shot by said shooting means thereby to reduce the amount of data; and said transmitting means of transmitting by wireless the data compressed by said compressing means; each in said data transmitting-side unit; and said receiving means of receiving the data transmitted from said data transmitting-side unit; said editing instruction inputting means of accepting the instructions for performing the final editing of the video recorded on said recording medium by using the data received by said receiving means; and said editing means of performing the final editing of the video recorded on said recording medium depending on said instructions accepted by said editing instruction inputting means; each in said data editing-side unit; in a data editing system of 1st invention.

Still yet another aspect of the present invention is a program for causing a computer to serve as all or a part of:

said receiving means of receiving the data transmitted from a data transmitting-side unit which shoots a video, then records the shot video onto a predetermined recording medium, then digitally compresses said shot video thereby to reduce the amount of data, and then transmits the compressed data by wireless;

said editing instruction inputting means of accepting the instructions for performing the final editing of the video recorded on said recording medium by using the data received by said receiving means; and said editing means of performing the final editing of the video recorded on said recording medium depending on said instructions accepted by said editing instruction inputting means.

DESCRIPTION OF THE REFERENCE NUMERALS

1 Data transmitting-side unit.
2 Camera
3 Microphone
4 Recording means
5 Tape
6 Compressing means
7 Portable telephone
8 Data editing-side unit
9 Receiving means
10 Reproducing means
11 Display
12 Draft editing equipment
13 Editing instruction inputting means
14 Final editing equipment 15 Real-time distributing means
16 Broadcasting means
17 Server
18 Internet
19 User-side transceiver
20 User-side display

DESCRIPTION OF THE INVENTION

The embodiments of the present invention are described below with reference to the drawings.

(Embodiment 1)

First, described is the configuration of a data editing system of Embodiment 1 of the present invention.

Figure 1:
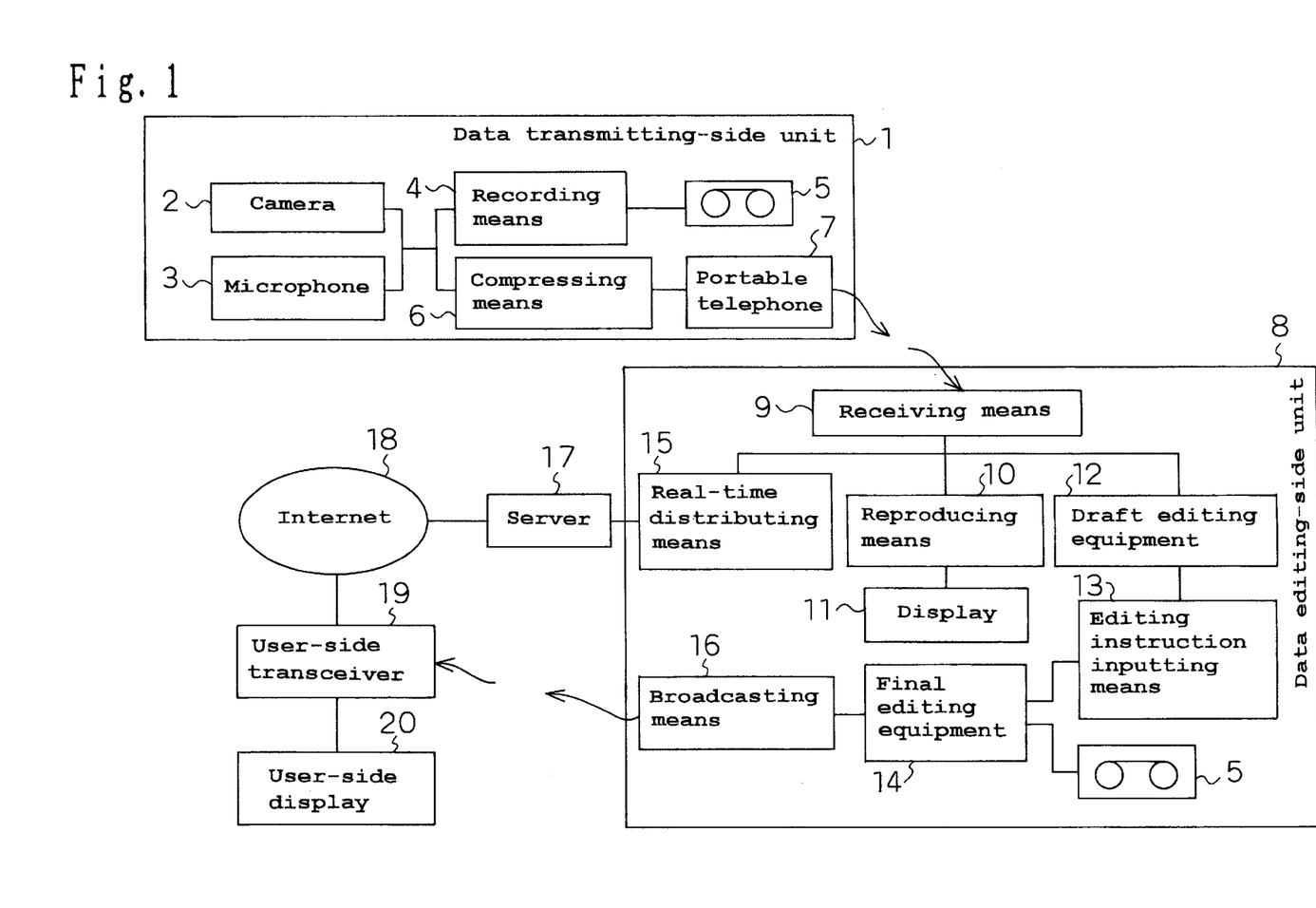
FIG. 1 is a block diagram of a data editing system of Embodiment 1 of the present invention.

FIG. 1 shows a block diagram of the data editing system. As shown in FIG. 1, a data editing system of Embodiment 1 of the present invention is composed of a data transmitting-side unit 1 and a data editing-side unit 8. The data transmitting-side unit 1 is carried by a cameraman and the like, while the data editing-side unit 8 is located in a broadcasting station. For the convenience of description, included in FIG. 1 are the Internet 18, a server 17 for storing data on the Internet 18, a user-side transceiver 19 located in a residence and the like, and a user-side display 20 connected to the user-side transceiver 19.

The data transmitting-side unit 1 comprises: a camera 2 for shooting a video; a microphone 3 for collecting a voice; recording means 4 of recording both the video shot by the camera 2 and the voice collected by the microphone 3, onto a tape 5; compressing means 6 of digitally compressing the shot video and the collected voice thereby to reduce the amount of data; and a portable telephone 7 for transmitting by wireless the data compressed by the compressing means 6.

The data editing-side unit 8 comprises: receiving means 9; reproducing means 10; a display 11; a draft editing device 12; editing instruction inputting means 13; a final editing device 14; real-time distributing means 15; and broadcasting means 16.

The receiving means 9 is means of receiving the data transmitted by the portable telephone 7 of the data transmitting-side unit 1. The reproducing means 10 is means of reproducing the data received by the receiving means 9. The display 11 is means of displaying the video reproduced by the reproducing means 10. The draft editing device 12 is means of performing the draft editing depending on the instructions by an editor on the data received by the receiving means 9.

The editing instruction inputting means 13 is means of receiving the instructions for performing the final editing of the video recorded on the tape 5 using the data of the draft editing by the draft editing device 12. The final editing device 14 is means of performing the final editing of the video recorded on the tape 5 depending on the instructions received by the editing instruction inputting means 13. In FIG. 1, it should be noted that the tape 5 within the data transmitting-side unit 1 is identical to the tape 5 within the data editing-side unit 8.

The real-time distributing means 15 is means of storing the data into the server 17 on the Internet 18 so that the data received by the receiving means 9 can be distributed onto the Internet 18 in real time. When storing the data into the server 17, the real-time distributing means 15 additionally stores the program publicity information on both the broadcasting channel and the broadcasting time when the data finally edited by the final editing device 14 is broadcasted from the broadcasting station, into the server 17.

The broadcasting means 16 is means of broadcasting the data finally edited by the final editing device 14 and of broadcasting the information for announcing that all the data which is the source of the finally edited data and has been received by the receiving means 9 is available for the users from the Internet 18 by using the user-side transceiver 19.

In Embodiment 1, the data transmitting-side unit 1 is used as an example of the data transmitting-side unit of a data editing system of the present invention, while the data editing-side unit 8 is used as an example of the data editing-side unit of a data editing system of the present invention. Further, in Embodiment 1, the camera 2 and the microphone 3 are used as an example of the shooting means of the data transmitting-side unit of a data editing system of the present invention. Furthermore, the recording means 4, the compressing means 6, and the portable telephone 7 are used as an example of the recording means, the compressing means, and the transmitting means, respectively of the data transmitting-side unit of a data editing system of the present invention.

Further, in Embodiment 1, the receiving means 9, the editing instruction inputting means 13, and the final editing device 14 are used as an example of the receiving means, the editing instruction in putting means, and the editing means, respectively, of the data editing-side unit of a data editing system of the present invention.

Furthermore, in Embodiment 1, the real-time distributing means 15 is used as an example of the distributing means and the data storage controlling means of a data editing system of the present invention, while the broadcasting means 16 is used as an example of the third transmitting means of a data editing system of the present invention.

Described below is the operation of a data editing system of Embodiment 1 of the present invention.

For the convenience of the following description, the operation of a data editing system of Embodiment 1 of the present invention is described below for the case that a ruin has been discovered in Nara, that a broadcasting station in Osaka sends a cameraman to the site of the ruin excavation in order to collect the news materials, and that the video shot by the cameraman is edited so that the news of "Excavation of a Ruin in Nara" is broadcasted in a three-minute article of an evening news program of that day. Further, it is assumed that the report that "the ruin has been discovered in Nara" reached the broadcasting station at two o'clock and that the broadcasting station sent the cameraman to the site of the ruin excavation at the instance of the reception of the report.

First, on receiving the instructions to shoot a video of the ruin excavation, the cameraman goes to the site of the ruin excavation in Nara with carrying a data transmitting-side unit 1. The cameraman then shoots a video of the ruin with a camera 2, and collects a voice during the excavation with a microphone 3. In the data transmitting-side unit 1, the recording means 4 records the shot video and the collected voice onto the tape 5. Here, it is assumed that the tape 5 records the news material data of one and a half hour in a high quality video and in a high quality voice.

Further, in the data transmitting-side unit 1, at the same time as that the news material data is recorded onto the tape 5, the compressing means 6 digitally compresses both the video shot by the camera 2 and the voice collected by the microphone 3 thereby to reduce the amount of data in real time, while the portable telephone 7 connected to the compressing means 6 transmits the data compressed by the compressing means 6 to the broadcasting station by wireless by using radio waves in real time. Here, it is assumed that the video and the voice reproduced from the data compressed by the compressing means 6 are of a low quality.

Next, in the data editing-side unit 8 located in the broadcasting station, the receiving means 9 receives the data from the portable telephone 7 of the data transmitting-side unit 1. The real-time distributing means.15 then stores the data into the server 17 on the Internet 18 so that all the news material data of one and a half hour of "Excavation of a Ruin in Nara" can be distributed on the Internet 18 in real time sequentially in the order of reception by the receiving means 9. At that time, the real-time distributing means 15 additionally stores the program publicity information on both the broadcasting channel and the broadcasting time when the program of "Excavation of a Ruin in Nara" is broadcasted from the broadcasting station, into the server 17. Here, since the data received by the receiving means 9 is the data compressed by the compressing means 6, the video and the voice distributed on the Internet 18 in real time are of a low quality.

As such, the real-time distributing means 15 distributes the overall video of "Excavation of a Ruin in Nara" on the Internet 18 sequentially in real time, and accordingly users can watch the overall video of "Excavation of a Ruin in Nara" in real time using the user-side transceiver 19, although the quality of the video and the voice is not good. Further, by virtue of the publicity information which is added to the real-time video and announces the news program containing the article of "Excavation of a Ruin in Nara," the users can watch the "Excavation of a Ruin" in a high quality video when the news on "Excavation of a Ruin in Nara" is broadcasted later.

In the data editing-side unit 8, once the receiving means 9 receives the data from the data transmitting-side unit 1, the reproducing means 10 sequentially reproduces the received data. Then, depending on the data, the display 11 displays the video. Here, the quality of the video is not good because the data on which the video is based is the data which is compressed by the compressing means 6 and then reproduced.

Then, viewing the video displayed on the display 11, an editor of the news program in the broadcasting station edits the data of "Excavation of a Ruin in Nara" received by the receiving means 9 using the draft editing device 12 so that the video can be contained in a predetermined time duration, for example, of three minutes of the article of the news program.

In the editing of this case, the quality of the video and the voice to be edited is not good, and hence this editing process generates the data which cannot be used intact in broadcasting. That is this process is the draft editing. However, as is described later, the use of the draft-edited data shortens the time necessary for the final editing of the video and the voice of a high quality recorded on the tape 5, after the tape 5 on which the video and the voice are recorded by the recording means 4 of the data transmitting-side unit 1 reaches the broadcasting station.

The draft editing conducted by the above-mentioned editor using the draft editing device 12 is further described below. As described above, viewing the video displayed on the display 11, the editor picks out necessary frames thereby to conduct the draft editing. At that time, the draft editing device 12 identifies the frame number of each frame picked out by the editor by using the number added to each frame in the data from the receiving means 9, thereby outputting the identified frame number to the editing instruction inputting means 13.

As such, since the frame number of each frame picked out by the editor is identified during the draft editing, the final editing conducted with the final editing device 14 after the tape 5 reaches the broadcasting station can be conducted only by using the identified frame numbers, and hence the editor does not need to view again the video reproduced from the tape 5.

Next, when the tape 5 on which the video and the voice are recorded by the data transmitting-side unit 1 reaches the broadcasting station, the final editing device 14 performs the final editing of the video recorded on the tape 5 depending on both the data from the tape 5 and the frame numbers identified by the draft editing device 12. Here, as described above, since the frame number of each frame to be picked out has been already identified during the draft editing, the final editing by the final editing device 14 is carried out in a short time. Accordingly, the time of editing after the arrival of the tape 5 to the broadcasting station is substantially shortened in comparison with the prior art.

Then, at the time of the news program in question, the broadcasting means 16 broadcasts the video and the voice of "Excavation of a Ruin in Nara" having undergone the final editing by the final editing device 14. The video and the voice broadcasted here are of a high quality because they are based on the tape 5 having recorded the data in a high quality.

Figure 2:
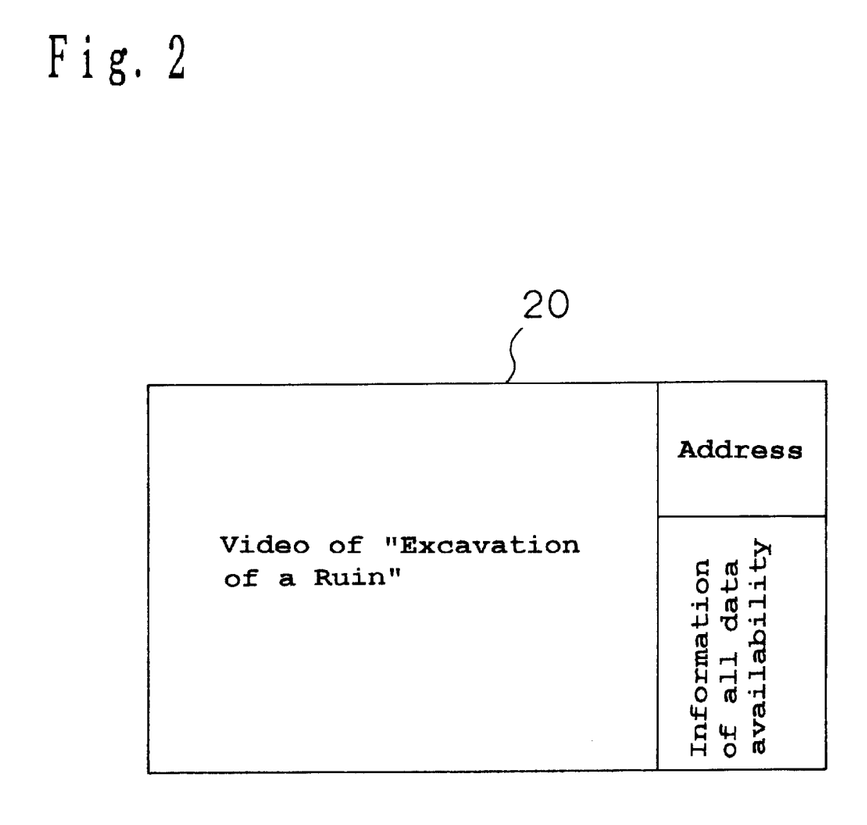
FIG. 2 is a configuration diagram of a user-side display 20 of Embodiment 1 of the present invention.

During the broadcasting of "Excavation of a Ruin in Nara," the broadcasting means 16 additionally broadcasts the information for announcing that all the data which is the source data of the broadcasted data and including the data not used in the broadcasting is available for the users from the Internet 18 by using the user-side transceiver 19. As shown in FIG. 2, the information includes an address displayed on the top right of the screen of the user-side display 20.

When a user is interested in the broadcasted "Excavation of a Ruin" and desires to watch all the video data of "Excavation of a Ruin," the user clicks the address displayed on the user-side display 20. This action permits the access to the server 17 via the user-side transceiver 19 and the Internet 18, whereby all the video data of "Excavation of a Ruin" is sequentially displayed on the user-side display 20 via the Internet 18 and the user-side transceiver 19. As such, the desire of the user is satisfied.

In the above-mentioned Embodiment 1, the operation of a data editing system of Embodiment 1 of the present invention has been described for the case that a broadcasting station in Osaka collects the news materials of a ruin excavated in Nara, and that the collected news materials are edited and then broadcasted. However, a data editing system of Embodiment 1 of the present invention is not restricted to that used in the above-mentioned scene of the editing and the broadcasting of the collected news materials. The above-mentioned data editing system of Embodiment 1 of the present invention can be used also in a scene that a broadcasting station collects the news materials of an event, such as a criminal case, a sports game, a music concert, and the like, in a geographically remote place and that the collected news materials are edited and then broadcasted.

Further, in the above-mentioned Embodiment 1, it has been described that the data editing-side unit 8 is located in a broadcasting station. However, the data editing-side unit of a data editing system of the present invention is not restricted to be located in the broadcasting station. In short, the data editing-side unit is located in a place geographically remote from the data transmitting-side unit of a data editing system of the present invention, previously acquires by wireless the data substantially identical to the data recorded on a recording medium such as a tape by the data transmitting-side unit, and performs the final editing of the video and the like on the recording medium, such as a tape having recorded the video, by using the previously acquired data.

Furthermore, in the above-mentioned Embodiment 1, it has been described that the compressing means 6 of the data transmitting-side unit 1 performs the digital compression in real time. However, it is not restricted to the real-time compression. For example, the digital compression may be carried out with a constant delay time after the shooting of the video. Further, in the above-mentioned embodiment, it has been described that the portable telephone 7 transmits in real time the data compressed by the compressing means 6. However, similarly to the above-mentioned case, the data transmission may be carried out with a constant delay time. In that case, the information of the time of shooting the video is preferably transmitted together with data. Further, the transmitted data may not be necessarily all of the shot data. For example, one in ten frames of the shot video may be untransmitted.

Furthermore, in the above-mentioned Embodiment 1, it has been described that when an editor conducts the draft editing by using the draft editing device 12, the draft editing device 12 identifies the frame number of each frame picked out by the editor thereby to output the identified frame number to the editing instruction inputting means 13. However, the editor may input the frame number directly to the editing instruction inputting means 13. Further, the picked-out frame may be identified, for example, by the time having elapsed from the beginning of the tape 5 to the position of the frame. For example, a frame may be identified as a frame at 30 minutes and 15 seconds from the beginning. Alternatively, in the final editing, the editor may input instructions for performing the final editing into the editing instruction inputting means 13 with viewing the reproduced video of the draft-edited data. In short, it is sufficient that the instructions for performing the final editing is input to the editing instruction inputting means 13.

Further, the portable telephone 7 of the data transmitting-side unit 1 in the above-mentioned Embodiment 1 may transmit additional information, such as the place and time of shooting of the video by the camera 2 of the data transmitting-side unit 1, a topic on the shooting provided by a user (for example, the cameraman) of the data transmitting-side unit 1, and the like, into the data editing-side unit 8 by radio waves. An example of such a topic is the kind of an earthenware vessel found by the excavation of the ruin. When such additional information is transmitted, the data editing-side unit 8 can performs the final editing by using the additional information. Further, examples of the additional information include the weather at the time of shooting, the lightness in the site of shooting, the direction of shooting the object, and the direction of the sun. When the direction of the sun is known, the direction of a shadow is advantageously known.

Further, in the above-mentioned Embodiment 1, the portable telephone 7 has been used as an example of the transmitting means of the data transmitting-side unit of a data editing system of the present invention. However, the transmitting means may be another mobile digital communication apparatus. Further, the transmitting means is not necessarily restricted to a mobile digital communication apparatus such as the portable telephone 7.

Further, a mobile digital communication apparatus such as a portable telephone may be used as the receiving means of the data editing-side unit 8 in the above-mentioned Embodiment 1.

Although it has not been described in the above-mentioned Embodiment 1, the data editing-side unit 8 may comprise: information accepting means of accepting information from a user (such as an editor) of the data editing-side unit 8; and transmitting means of transmitting by wireless the information accepted by the information accepting means; while the data transmitting-side unit 1 may comprise: receiving means of receiving the information transmitted by the data editing-side unit 8; and information outputting means of outputting the information received by the receiving means.

Figure 3:
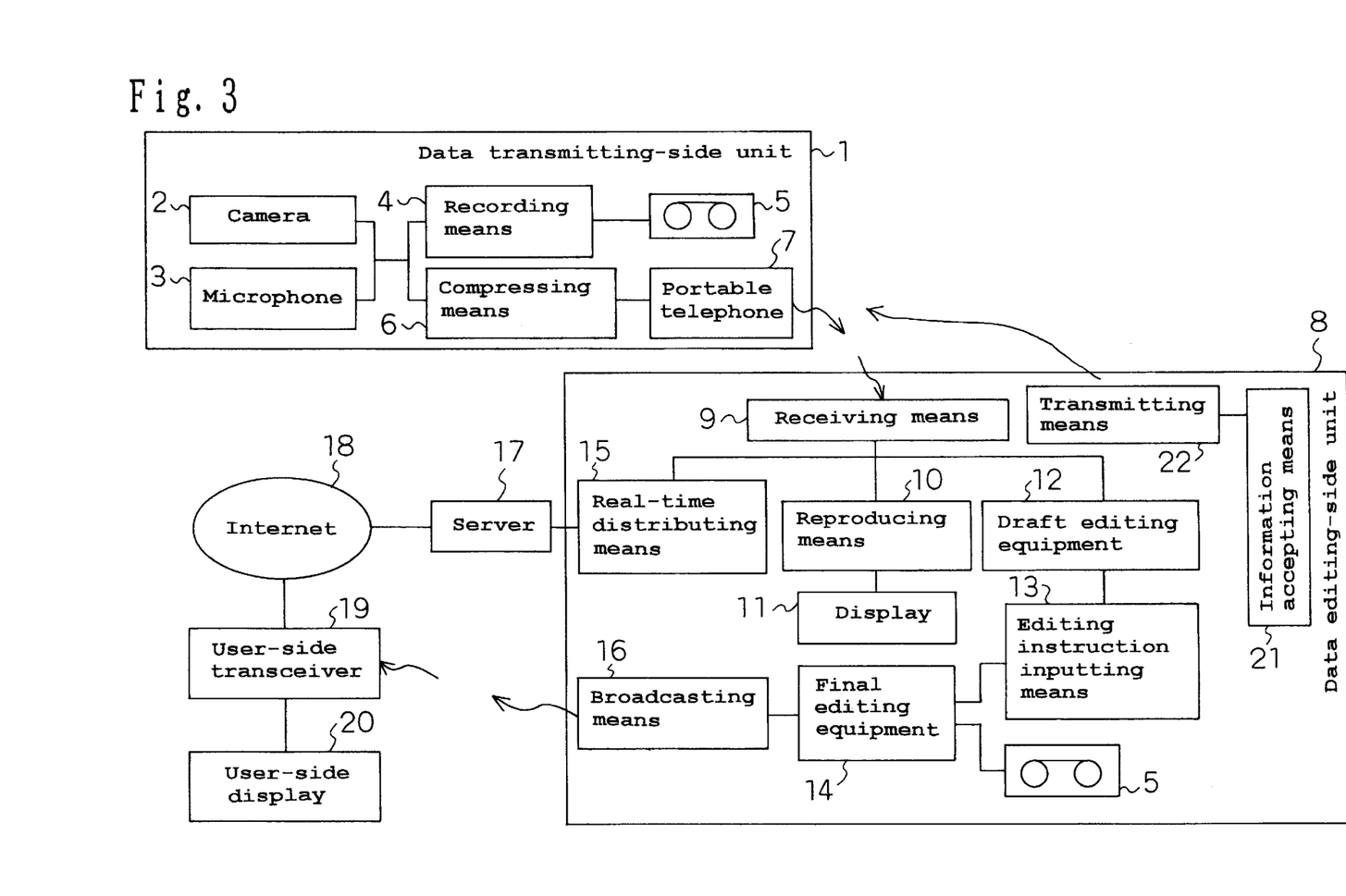
FIG. 3 is a block diagram of a data editing system of an embodiment of the present invention.

FIG. 3 shows the configuration of a data editing system in the case that the data editing-side unit 8 comprises the information accepting means 21 and the transmitting means 22 described above. In FIG. 3, the portable telephone 7 of the data transmitting-side unit 1 receives the information from the transmitting means 22 of the data editing-side unit 8, whereby the received information is displayed in the view finder of the camera 2 which the cameraman is viewing. Thus, in the case of FIG. 3, the portable telephone 7 corresponds to an example of the receiving means of receiving the information transmitted from the data editing-side unit 8, while the view finder of the camera 2 corresponds to an example of the information outputting means.

Figure 4:
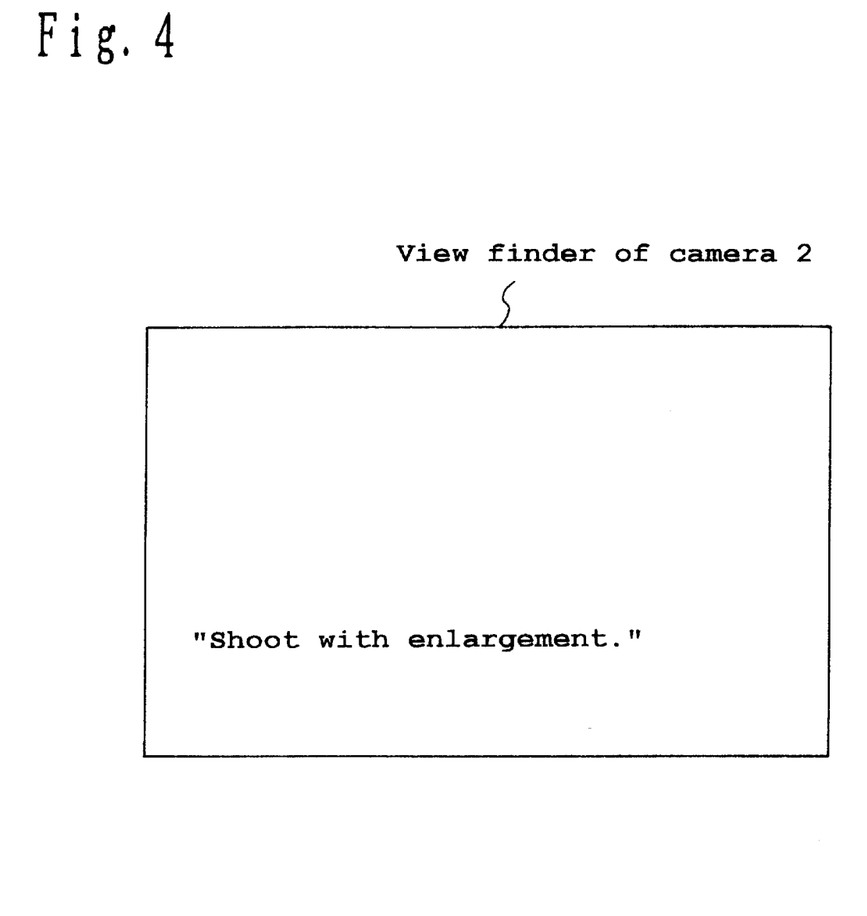
FIG. 4 is a diagram showing the view finder of a camera.

For example, when the cameraman is shooting the video of the above-mentioned "Excavation of a Ruin," and when an earthenware vessel is excavated, the editor in the broadcasting station may desire to have an enlarged shot of the earthenware vessel. In that case, in accordance with the system shown in FIG. 3, the editor inputs the information indicating the desire into the information accepting means 21. The transmitting means 22 then transmits the information of "shoot with enlargement" into the data transmitting-side unit 1. In the data transmitting-side unit 1, the portable telephone 7 receives the information, whereby the information of "shoot with enlargement" is displayed in the view finder of the camera 2 as shown in FIG. 4. This results in the effect that the cameraman can shoot an enlarged video of the earthenware vessel in response to the instruction from the editor in the broadcasting station.

Here, in the example of FIG. 3, the portable telephone 7 has been used as an example of the receiving means of receiving the information transmitted by the data editing-side unit 8. However, receiving means other than the portable telephone 7 may be provided in the data transmitting-side unit 1. Further, in the example of FIG. 3, the view finder of the camera 2 has been used as an example of the information outputting means. However, the information outputting means is not restricted to the view finder, and may output the information in a sound. In short, it is sufficient that the information outputting means can output the information from the user of the data editing-side unit 8.

Further, a mobile digital communication apparatus such as a portable telephone may be used as the information accepting means 21 and/or the transmitting means 22 of the data editing-side unit 8. Similarly, the portable telephone 7 may also serve as the receiving means and/or the information outputting means of the data transmitting-side unit 1. Alternatively, another mobile digital communication apparatus may be used as the receiving means and/or the information outputting means.

Further, as described above with reference to FIG. 1, users can watch all the video of "Excavation of a Ruin in Nara" prior to the broadcasting by using the user-side transceiver 19. In that case, a user watches an earthenware vessel and may desire to watch an enlarged shot of the earthenware vessel, similarly to the above-mentioned editor in the broadcasting station.

Figure 5:
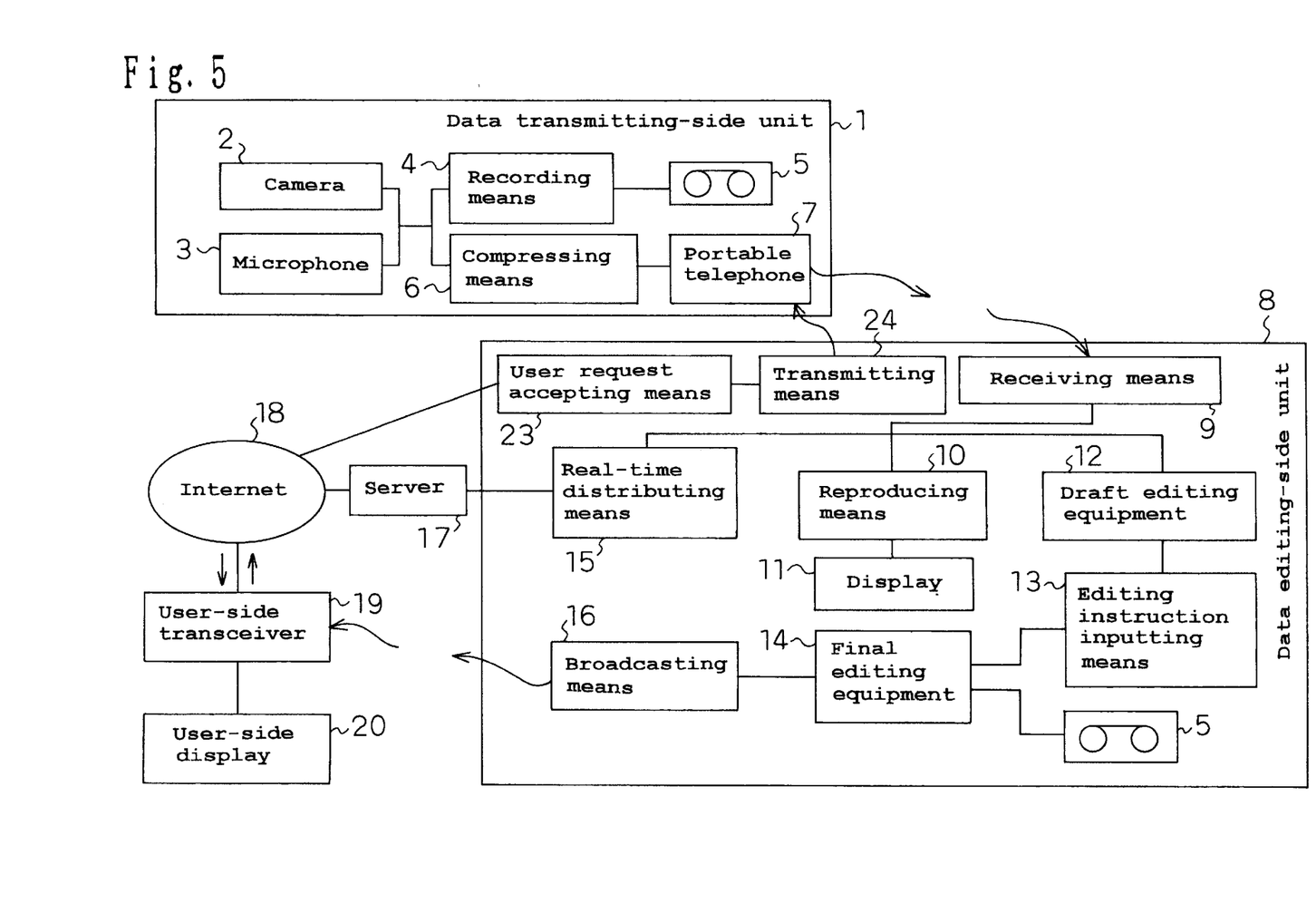
FIG. 5 is a block diagram of a data editing system of an Embodiment of the present invention.

Thus, as shown in FIG. 5, the data editing-side unit 8 may comprise: user request accepting means 23 of accepting such a request by a user via the Internet 18; and transmitting means 24 of transmitting the information accepted by the user request accepting means 23 into the data transmitting-side unit 1. In that case, the user-side transceiver 19 needs to have the capability of transmitting the information in addition to the capability of receiving the information. In the data transmitting-side unit 1, as described above with reference to FIG. 3, for example, the portable telephone 7 receives the information from the transmitting means 24 of the data editing-side unit 8, and the received information is then displayed in the view finder of the camera 2. In such a system as shown in FIG. 5, the user can watch a video desired by himself.

Here, it may be configured so that when the user request accepting means 23 receives the same request from the users exceeding a predetermined number, the transmitting means 24 transmits the accepted information to the data transmitting-side unit 1. Alternatively, it may be configured so that the editor of the data editing-side unit 8 understands the user request accepted by the user request accepting means 23 thereby to select the necessary information and that the transmitting means 24 then transmits the selected information to the data transmitting-side unit 1.

Furthermore, in the above-mentioned Embodiment 1, it has been described that the real-time distributing means 15 distributes the overall video of "Excavation of a Ruin in Nara" on the Internet 18 sequentially in real time. However, the present invention is not restricted to the distribution of the overall video. A part of the video may be undistributed. For example, in case of collecting the news materials of a criminal case and the like, and in case that a gruesome scene is included in the video, the scene may be undistributed. Further, for example, in case of a scene harmful to the public order, the scene may be removed from the distributed video automatically or by the operation of an editor and the like. That is, the real-time distributing means 15 may distribute a part of the shot video.

Furthermore, it has been described that the real-time distributing means 15 distributes the video in real time. However, the present invention is not restricted to the real-time distribution. For example, the distribution may be performed with a constant delay time after the receiving means 9 receives the data.

Furthermore, in the above-mentioned Embodiment 1, it has been described that the real-time distributing means 15 is provided in the data editing-side unit 8. However, the real-time distributing means 15 may be provided outside the data editing-side unit 8. In that case, the real-time distributing means 15 needs to acquire the video data directly or indirectly from the data transmitting-side unit 1.

Furthermore, in the above-mentioned Embodiment 1, it has been described that the server 17 stores all the data from the real-time distributing means 15. However, the server 17 may store the data from the data transmitting-side unit 1, not via the data editing-side unit 8. Further, the server 17 may store not all of the video and the voice shot and collected by the data transmitting-side unit 1. In short, it is sufficient that the server 17 stores all or a part of the video and the voice shot and collected by the data transmitting-side unit 1.

Furthermore, in the above-mentioned Embodiment 1, voice data also has been described. However, the data editing object may not include the voice.

Furthermore, in the above-mentioned Embodiment 1, as described above with reference to FIG. 2, it has been described that an address included in the information for announcing that all the data including the data not used in the broadcasting is available for the users from the Internet 18 is displayed on user-side display 20, and that when a user clicks the address, the above-mentioned all data is displayed on the user-side display 20. However, instead of clicking the displayed address by the user, the user may input the address using a personal computer, whereby the data is obtained form the server 17 via the Internet 18, and then displayed on a display connected to the personal computer.

Furthermore, in the above-mentioned Embodiment 1, the tape 5 has been used as the recording medium on which the receiving means of a data editing system of the present invention records the video. However, another recording medium may be used.

Further, the present invention is a program for causing a computer to perform the function of all or a part of the means of the above-mentioned data editing system of the present invention (or alternatively, one or both of the data transmitting-side unit and the data editing-side unit), and hence a program working in cooperation with the computer.

Here, "a part of the means of the present invention" indicates either a certain number of pieces of the plural pieces of the means thereof or a part of the function of a piece of means.

Further, a computer readable recording medium having recorded a program of the present invention is included within the scope of the present invention.

In an embodiment of the use of a program of the present invention, the program may be recorded on a computer readable recording medium thereby to work in cooperation with a computer.

Further, in an embodiment of the use of a program of the present invention, the program may be transferred through a transferring medium, and read by a computer thereby to work in cooperation with the computer.

The media include a ROM, while the transferring media include a transferring medium such as the Internet, light, radio waves, and sound waves.

Further, the computer of the present invention referred above is not limited pure hardware such as CPU or the like, and it may include firmware, operating system, I/O devices and peripheral devices.

Further, as described above, the configuration of the present invention may be implemented by a software or a hardware.

As is understood from the above-mentioned description, the present invention can provide a data editing system for completing the editing of a video in a shorter time than that of the prior art after the arrival of the tape having recorded the video to a broadcasting station, and a data editing-side unit included in the data editing system.

What is claimed is:

1. A data editing system comprising:
 a data transmitting-side unit, disposed at a remote location, including at least: shooting means of shooting a video; recording means of recording the video shot by said shooting means onto a predetermined recording medium; compressing means of digitally compressing the video shot by said shooting means thereby to reduce the amount of data; and transmitting means of transmitting by wireless the data compressed by said compressing means; and
 a data editing-side unit, at a data editing location different from the remote location, including at least: receiving means of receiving the data transmitted from said data transmitting-side unit; editing instruction inputting means of accepting the instructions for performing the final editing of the video recorded on said predetermined recording medium by using the data received by said receiving means; and editing means of performing the final editing of the video recorded on said predetermined recording medium depending on said instructions accepted by said editing instruction inputting means;

wherein the predetermined recording medium itself is delivered from the remote location to the data editing-side unit at the data editing location, the compressed data is transmitted from the remote location to the data editing-side unit for performing draft editing and producing editing instructions for the final editing, and the final editing of the video recorded on the delivered predetermined recording medium is performed, after performing the draft editing and producing the editing instructions.

2. A data editing system according to claim 1, wherein said compressing means performs said digital compression substantially in real time, and wherein said transmitting means transmits said compressed data substantially in real time.

3. A data editing system according to claim 1 or 2, wherein said editing instruction inputting means performs a draft editing on said received data and then performs the final editing by using the result of the draft editing.

4. A data editing system according to claim 1 or 2, wherein said transmitting means and/or said receiving means is a mobile digital communication apparatus.

5. A data editing system according to claim 1 or 2, wherein said transmitting means further transmits additional information on said video.

6. A data editing system according to claim 5, wherein said additional information includes all or a part of: the place of shooting said video; the time of shooting said video; and information accepted from a user of said data transmitting-side unit.

7. A data editing system according to claim 1 or 2, wherein said data editing-side unit comprises: information accepting means of accepting information from a user of the data editing-side unit; and second transmitting means of transmitting by wireless the information accepted by the information accepting means; and wherein said data transmitting-side unit comprises: second receiving means of receiving the information transmitted from said data editing-side unit; and information outputting means of outputting the information received by the second receiving means.

8. A data editing system according to claim 1 or 2, further comprising distributing means of distributing all or a part of the data transmitted by said transmitting means of said data transmitting-side unit, onto the Internet substantially in real time.

9. A data editing system according to claim 8, wherein said data editing-side unit is located in a broadcasting station, and wherein during said Internet distribution, said distributing means distributes the publicity information on both the broadcasting channel and the broadcasting time of the edited data finally edited by said editing means, together with all or a part of the data transmitted by said transmitting means.

10. A data editing system according to claim 1 or 2, wherein said data editing-side unit is located in a broadcasting station, and further comprises:

third transmitting means of broadcasting the data finally edited by said editing means and of broadcasting the information indicating that all or a part of the video which is shot by said shooting means and is the source of the edited data is available from the Internet for the users on the receiving side of said edited data; and data storage controlling means of storing all or a part of the video shot by said shooting means into predetermined data storing means on said Internet so that the video is available from the Internet for the users on the receiving side of said edited data.

11. A data editing system of according to claim 1 or 2, wherein said video includes a voice.

12. A data editing-side unit comprising:

receiving means of receiving data transmitted from a data transmitting-side unit at a remote location, which shoots a video, then records the shot video onto a predetermined recording medium, then digitally compresses said shot video thereby to reduce the amount of data, and then transmits the compressed data by wireless; the receiving means disposed at an editing location different from the remote location;

editing instruction inputting means of accepting the instructions for performing the final editing of the video recorded on said predetermined recording medium by using the data received by said receiving means; and editing means of performing the final editing of the video recorded on said recording medium depending on said instructions accepted by said editing instruction inputting means;

wherein the predetermined recording medium itself is delivered from the remote location to the receiving means at the data editing location, the compressed data is transmitted from the remote location to the receiving means at the data editing location for performing draft editing and producing editing instructions for the final editing, and the final editing of the video recorded on the delivered predetermined recording medium is performed, after performing the draft editing and producing the editing instructions.

13. A data editing-side unit according to claim 12, wherein said editing instruction inputting means performs a draft editing on said received data and then performs the final editing by using the result of the draft editing.

14. A data editing-side unit according to claim 12 or 13, wherein said receiving means is a mobile digital communication apparatus.

15. A data editing-side unit according to claim 12 or 13 comprising: information accepting means of accepting information from a user of the data editing-side unit; and transmitting means of transmitting by wireless the information accepted by the information accepting means.

16. A data editing-side unit according to claim 12 or 13, comprising distributing means of distributing all or a part of the data received by said receiving means, onto the Internet substantially in real time.

17. A data editing-side unit according to claim 16, wherein said data editing-side unit is located in a broadcasting station, and wherein during said Internet distribution, said distributing means distributes publicity information on both the broadcasting channel and the broadcasting time of the edited data finally edited by said editing means, together with all or a part of the data received by said receiving means.

18. A data editing-side unit according to claim 12 or 13, wherein said data editing-side unit is located in a broadcasting station, and comprises:

second transmitting means of broadcasting the data finally edited by said editing means and of broadcasting the information indicating that all or a part of the video which is shot by the shooting means of said data transmitting-side unit and is the source of the edited data is available from the Internet for the users on the receiving side of said edited data; and wherein all or a part of the video shot by said shooting means is stored into predetermined data storing means on said Internet so that the video is available from the Internet for the users on the receiving side of said edited data.

19. A data editing-side unit according to claim 12 or 13, wherein said video includes a voice.

20. A data editing system according to claim 1 including a program for causing a computer to serve as all or a part of:

said recording means of recording the video shot by said shooting means onto a predetermined recording medium; said compressing means of digitally compressing the video shot by said shooting means thereby to reduce the amount of data; and said transmitting means of transmitting by wireless the data compressed by said compressing means; each in said data transmitting-side unit; and said receiving means of receiving the data transmitted from said data transmitting-side unit; said editing instruction inputting means of accepting the instructions for performing the final editing of the video recorded on said recording medium by using the data received by said receiving means; and said editing means of performing the final editing of the video recorded on said recording medium depending on said instructions accepted by said editing instruction inputting means.

21. A data editing side unit according to claim 12 including a program for causing a computer to serve as all or a part of:

said receiving means of receiving the data transmitted from a data transmitting-side unit which shoots a video, then records the shot video onto a predetermined recording medium, then digitally compresses said shot video thereby to reduce the amount of data, and then transmits the compressed data by wireless;

said editing instruction inputting means of accepting the instructions for performing the final editing of the video recorded on said recording medium by using the data received by said receiving means; and said editing means of performing the final editing of the video recorded on said recording medium depending on said instructions accepted by said editing instruction inputting means.

22. A method of editing a video program comprising the steps of:

(a) shooting a video with a camera at a remote location;

(b) recording the video shot in step (a) at the remote location;

(c) digitally compressing the recorded video shot in step (b) at the remote location;

(d) transmitting the compressed video of step (c) from the remote location;

(e) receiving the transmitted compressed video of step (d) in an editing location, different from the remote location, for editing;

(f) draft editing the transmitted compressed video of step (e) to produce editing instructions;

(g) delivering the recorded video itself of step (b) to the editing location after having received the transmitted compressed video in step (e); and (h) final editing the delivered recorded video of step (g) by using the editing instructions produced in step (f) to obtain a finally edited video program.

23. The method of claim 22 in which draft editing the video to produce editing instructions in step (d) includes identifying a location of a portion of the draft edited video with a location of a corresponding portion of the video recorded in step (b).

* * * * *